(12) United States Patent
Lee

(10) Patent No.: US 8,695,523 B2
(45) Date of Patent: Apr. 15, 2014

(54) APPARATUS FOR REDUCING PITCHING AND ROLLING MOTION OF VESSEL

(75) Inventor: Seok-Soon Lee, Jinju-si (KR)

(73) Assignee: Industry-Academic Cooperation Foundation Gyeongsang National University, Jinju-Si, Gyeongsangnam-Do (KR)

( * ) Notice: Subject to any disclaimer, the term of this patent is extended or adjusted under 35 U.S.C. 154(b) by 103 days.

(21) Appl. No.: 13/389,510

(22) PCT Filed: Mar. 14, 2011

(86) PCT No.: PCT/KR2011/001757
§ 371 (c)(1),
(2), (4) Date: Feb. 8, 2012

(87) PCT Pub. No.: WO2011/118930
PCT Pub. Date: Sep. 29, 2011

(65) Prior Publication Data
US 2012/0137946 A1 Jun. 7, 2012

(30) Foreign Application Priority Data
Mar. 25, 2010 (KR) .................. 10-2010-0026893

(51) Int. Cl.
*B63B 39/00* (2006.01)
(52) U.S. Cl.
USPC ......................................... 114/122
(58) Field of Classification Search
USPC ......................................... 114/122
See application file for complete search history.

(56) References Cited

U.S. PATENT DOCUMENTS

| | | | | | |
|---|---|---|---|---|---|
| 3,815,536 | A | * | 6/1974 | Duc | 114/122 |
| 4,167,147 | A | * | 9/1979 | Bergman | 114/122 |
| 4,582,014 | A | * | 4/1986 | Patel | 114/125 |
| 5,787,832 | A | * | 8/1998 | Spinka | 114/123 |

FOREIGN PATENT DOCUMENTS

| | | |
|---|---|---|
| JP | 62-244790 A | 10/1987 |
| JP | 03-197294 | 8/1991 |
| JP | 07-329880 | 12/1995 |
| JP | 09-142380 | 6/1997 |
| KR | 10-1992-0702311 | 9/1992 |

OTHER PUBLICATIONS

International Search Report mailed Nov. 29, 2011 for PCT/KR2011/001757, citing the above references.
Written opinion of KIPO mailed Jan. 12, 2012 for Korean patent 10-2010-0026893, citing the above reference.
Japanese Office Action for application No. 2013-501179 dated Feb. 18, 2014.

\* cited by examiner

*Primary Examiner* — Stephen Avila
(74) *Attorney, Agent, or Firm* — Lowe Hauptman & Ham, LLP

(57) ABSTRACT

Provided is an apparatus for reducing the pitching and rolling motion of a vessel, the apparatus including a plurality of buoyancy members spaced apart from each other and vertically slidably mounted on a vessel, a plurality of hydraulic cylinders that are connected to the upper end portions of the respective buoyancy members and receive the locomotive power of the buoyancy members that rise from waves, and a hydraulic connection line provided in such a manner that the hydraulic pressures of the hydraulic cylinders are interconnected, so that the hydraulic pressures, which are generated from the rise of the hydraulic cylinders due to the rise of the buoyancy members located at the peaks of the waves, can be supplied to the hydraulic cylinders located at the troughs of the waves to cause the buoyancy members to fall, thereby increasing the buoyancy of the vessel and restraining the pitching and rolling thereof.

10 Claims, 2 Drawing Sheets

APPARATUS FOR REDUCING PITCHING AND ROLLING MOTION OF VESSEL

CROSS REFERENCE TO RELATED APPLICATION

This application claims the priority of Korean Patent Application No. 10-2010-0026893, filed on Mar. 25, 2010 in the KIPO (Korean Intellectual Property Office). Further, this application is the National Phase application of International Application No. PCT/KR2011/001757, filed on Mar. 14, 2011, which designates the United States and was published in Korean.

BACKGROUND OF THE INVENTION

1. Field of the Invention

The present invention relates to an apparatus for reducing pitching and rolling motions of a vessel, and more particularly, to an apparatus for reducing pitching and rolling motions of a vessel caused by waves.

2. Description of the Related Art

Generally, when a vessel that travels over sea sails across or lies in a billowy sea area, the vessel is subjected to movement such as pitching-a vertical motion and rolling-a lateral motion, so that there is a risk of the occurrence of a safety accident on the passengers because they lose their balances, and if passengers who have no or little experience in boarding are continuously subjected to repetitive shaking of a vessel, they may suffer from seasickness accompanied by a headache and vomiting, putting a blight on their voyage. Further, it is difficult to stably carry out the work of making repairs or moving an object.

In order to reduce such shaking of a vessel, a bilge keel has been conventionally used. The bilge keel is a fin-type stabilizing device that is fitted on each side of a vessel so as to push out water in opposite direction from the center of the vessel, using the fin-type area, thereby reducing the rolling of the vessel.

However, since the conventional bilge keel mainly carries out restricting only the rolling motion of the vessel caused by waves, such restriction in motion is not sufficient to considerably reduce the shaking of a vessel in such a manner as to make passengers feel pleasant, nor restricts a pitching motion of a vessel.

SUMMARY OF THE INVENTION

Technical Problem

An object of the present invention is to provide an apparatus for reducing pitching and rolling motions of a vessel caused by waves in order to make passengers feel pleasant.

Solution to Problem

The present invention provides an apparatus for reducing pitching and rolling motions of a vessel according to an aspect of the present invention. The apparatus includes: a plurality of buoyant members disposed in such a manner as to be vertically slidable; a plurality of hydraulic cylinders each connected to an upper end of the buoyant member to receive a moving force of the buoyant member that ascends with the action of waves; and a hydraulic connection line unit connected in such a manner that hydraulic pressures of the hydraulic cylinders communicate with each other such that hydraulic pressure that is generated concurrently with a rise of the hydraulic cylinder when the buoyant member located at hill of a wave ascends is supplied to the hydraulic cylinder located at dale of a wave so as to lower the buoyant member to cause the buoyant force of the vessel to increase, thereby restricting the shaking of the vessel.

The buoyant member may be disposed at stem or stern of the vessel.

The buoyant member may be oppositely disposed one for each side of the vessel.

The buoyant member may be disposed at the bottom of the vessel.

The apparatus may include a damping valve that is disposed between the hydraulic cylinders and the hydraulic connection line unit to perform a control operation such that high hydraulic pressure of the hydraulic cylinder, which is generated concurrently with a rise of the buoyant member by means of the action of waves, is allowed to pass through the hydraulic cylinders and hydraulic connection line unit, and hydraulic pressure generated by a change in load of an object including goods shipped in a vessel, the magnitude of load being smaller than the buoyant force of a vessel, is blocked from passing through the hydraulic cylinders and hydraulic connection line unit.

Here, the damping valve may include: a barrel-type body section, opposite ends of which are coupled to the hydraulic cylinders and hydraulic connection line unit in an inter-communication manner, and having first and second engagement parts in an inner side thereof; a first control plate installed in such a manner as to be vertically slidable between the bottom of the body section and the second engagement part and having a central hole; a first elastic member installed between the first control plate and the bottom of the body section to support the first control plate; a control rod installed in such a manner as to be vertically slidable through the first engagement part and having at a lower end thereof a second control plate opposite to the first control plate; and a second elastic member installed between the second control plate and the first engagement part in such a manner as to be inserted around the control rod to allow the second control plate to block the central hole of the first control plate. Further, the elastic force of the second elastic member may be greater than that of the first elastic member.

The apparatus may further include a barrel-type guide member through which the buoyant member is guided to vertically move in an inserted state, and a third elastic member disposed inside of the guide member to prevent the buoyant member that is ascending from colliding with the guide member.

Advantageous Effects of Invention

According to the apparatus for reducing pitching and rolling motions of a vessel, the plurality of buoyant members are disposed such that the hydraulic cylinders connected with each other via the hydraulic connection line unit are respectively connected to the upper ends of the buoyant members. This causes that hydraulic pressure that is generated concurrently with a rise of the hydraulic cylinder when the buoyant member located at hill of a wave ascends is supplied to the hydraulic cylinder located at dale of a wave so as to lower the buoyant member to cause the buoyant force to increase, thereby restricting the shaking of the vessel.

DESCRIPTION OF EMBODIMENTS

Hereinafter, preferred embodiments of the present invention will be described in detail with reference to the accompanying drawings.

Figure 1:
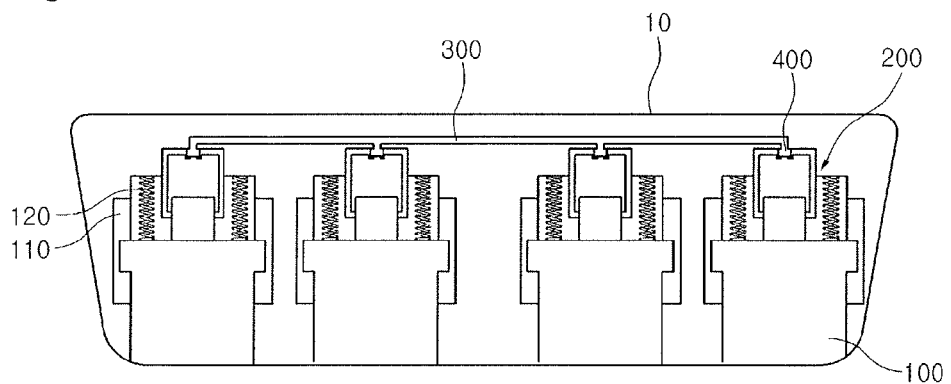
FIG. 1 is a cross-sectional view showing the schematic construction of an apparatus for reducing pitching and rolling motions of a vessel according to an embodiment of the present invention.
Figure 2:
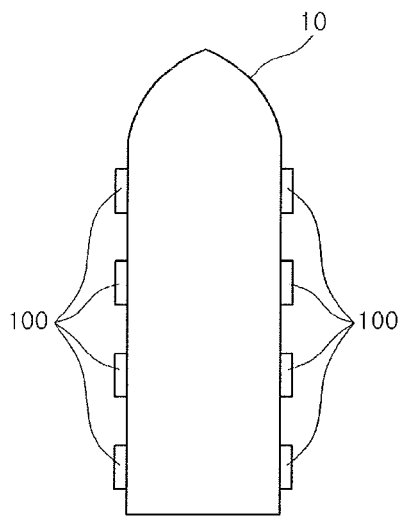
FIG. 2 is a plan view showing the state of the apparatus for reducing pitching and rolling motions of a vessel being installed.
Figure 3:
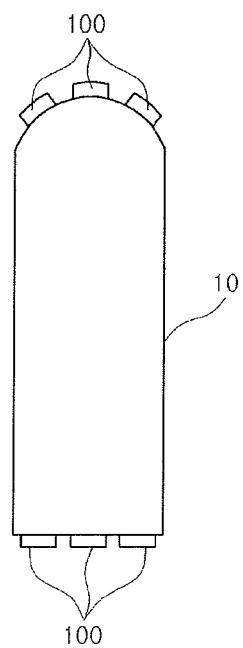
FIG. 3 is a plan view showing an apparatus for reducing pitching and rolling motions of a vessel according to another embodiment.

FIG. 1 is a cross-sectional view showing the schematic construction of an apparatus for reducing pitching and rolling motions of a vessel according to an embodiment of the present invention, FIG. 2 is a plan view showing the state of the apparatus for reducing pitching and rolling motions of a vessel being installed, and FIG. 3 is a plan view showing an apparatus for reducing pitching and rolling motions of a vessel according to another embodiment. Referring to FIGS. 1 to 3, the apparatus for reducing pitching and rolling motions of a vessel includes buoyant members 100, hydraulic cylinders 200, and a hydraulic connection line unit 300.

The plurality of buoyant members 100 is disposed in a vessel so as to regulate the buoyant force of the vessel 10 in response to waves. The buoyant members 100 are oppositely arranged in a spaced manner on opposite sides of the vessel 10. The buoyant members are installed at the outside or inside of the vessel 10 in such a manner as to be vertically slidable such that they rise and fall as the waves roll. Thus, upon surging of waves upon the vessel 10, as the buoyant members 100 located at the hills of waves ascend with the buoyant force of waves, the buoyant force of the vessel 10 is reduced as much. Here, if the buoyant members 100 are installed at the inside of the vessel 10, the portions where the buoyant members are installed are made open such that the buoyant members can come into contact with the waves therethrough.

Figure 4:
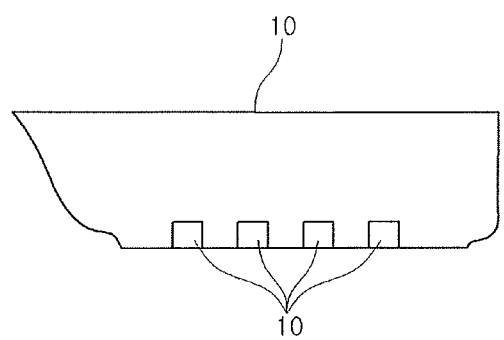
FIG. 4 is a side view showing an apparatus for reducing pitching and rolling motions of a vessel according to still another embodiment.

Referring to FIG. 3, the buoyant members 100 may be arranged in a spaced manner at the inside or outside of stem and stern of a vessel. Further, as shown in FIG. 4, the buoyant members 100 may be arranged in a spaced manner at the inside of the bottom of the vessel 10. Alternatively, the buoyant members 100 may be arranged in a spaced manner along an inner or outer circumference of the vessel 10. Herein, if the buoyant members 100 are also installed at the inside of the vessel 10, the portions where the buoyant members 100 are installed are made open such that the buoyant members can come into contact with the waves therethrough.

The buoyant member 100 may be formed of a closed barrel-type member having a cavity therein, which is made of but is not limited to Styrofoam. The buoyant member may also be made of any material so long as the material has improved buoyancy to ascend a vessel on the sea. Here, if the buoyant member 100 is formed of a closed barrel-type member having a cavity therein, it may be made of metal or plastic material. While the buoyant member 100 is shaped like a rectangle according to an embodiment, the buoyant member is not limited to that shape, but may be shaped like a circle or a polygon other than a rectangle.

The buoyant member 100 may be vertically movably inserted into a guide member 110 coupled to the outside of the vessel 10, wherein the guide member is open downwards. If the buoyant member 100 is inserted into and installed to the guide member 110, the buoyant member 100 can receive the buoyant force of waves only in the vertical direction, so that it can ascend in a stable manner. The guide member 110 may be provided at an inner upper surface thereof with a third elastic member 120. That is, the third elastic member 120 is disposed between the inner upper surface of the guide member 110 and the upper end of the buoyant member 100 in order to prevent the buoyant member 100 that is ascending from colliding with the guide member 110. Here, while the third elastic member 120 has been illustrated to be composed of a spring, the third elastic member is not limited to the spring, but may selectively use other elastic member that is elastic.

The hydraulic cylinder 200 receives a moving force of the buoyant member 100 that ascends with the action of waves. The hydraulic cylinders 200 each are connected to the upper ends of the respective buoyant members 100. That is, a rod end of the hydraulic cylinder 200 is connected to the upper end of the buoyant member 100 so that when the buoyant member 100 ascends with the action of waves, the hydraulic cylinder 200 receives the ascending force of the buoyant member 100 and then a piston thereof (not shown) is pushed up to increase an internal hydraulic pressure.

The hydraulic connection line unit 300 is configured to transmit high hydraulic pressure, generated by the hydraulic cylinder 200 receiving the ascending force of the buoyant member 100 when the buoyant member 100 ascends by the action of waves, to another hydraulic cylinder 200, resulting in descent of the buoyant member 100. That is, the hydraulic connection line unit 300 is configured such that high hydraulic pressure that is generated concurrently with the piston of the hydraulic cylinder 200 being pushed-up when the buoyant member 100 located at hill of a wave ascends is supplied to the hydraulic cylinder 200 located at dale of a wave so as to lower the buoyant member 100 to cause the buoyant force of a vessel 10 to increase, thereby restricting the shaking of the vessel 10.

The hydraulic connection line unit 300 is a single pipe member connecting the respective hydraulic cylinders and through which hydraulic pressure is guided and carried via the same line. Thus, the hydraulic cylinder 200 that is located at hill of a wave so that it is actuated concurrently with ascent of the buoyant member 100 increases the hydraulic pressure, which in turn is supplied to another hydraulic cylinder 200, i.e. the hydraulic cylinder 200 that is located at dale of a wave, via the hydraulic connection line unit 300, allowing the buoyant force of the vessel 100 to increase while lowering the buoyant member 100, thereby keeping the vessel 10 in a horizontal state.

Further, a damping valve 400 may be installed between the hydraulic connection line unit 300 and respective hydraulic cylinder 200. The damping valve 400 is configured such that only the hydraulic pressure generated by the buoyant member 100 is allowed to communicate with another hydraulic cylinder 200 via the hydraulic connection line unit 300, and lower hydraulic pressure generated by an external force caused by such as goods shipped in the vessel 10 is blocked from circulating via the hydraulic connection line unit 300, thereby preventing the shaking of a vessel 10 from being amplified. That is, when high hydraulic pressure is introduced towards the hydraulic cylinder 200 along the hydraulic connection line unit 300, the damping valve 400 is opened due to a lower pressure difference and allows the high hydraulic pressure to pass therethrough.

Figure 5:
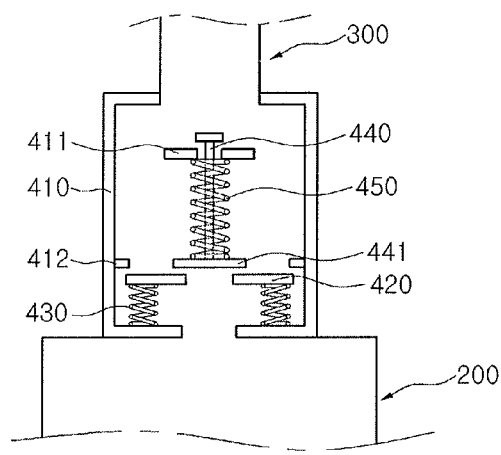
FIG. 5 is an enlarged cross-sectional view showing a damping device shown in FIG. 1.

Referring to FIG. 5, the damping valve 400 includes a body section 410, a first control plate 420, a first elastic member 430, a control rod 440, and a second elastic member 440.

The body section 410 is a barrel-type member which is connected with the hydraulic cylinder 200 and the hydraulic connection line unit 300, respectively, in a communication manner. Referring to FIG. 1, an upper end of the body section 410 is communication-connected with the hydraulic connection line unit 300, and a lower end of the body section is communication-connected with the hydraulic cylinder 200. The body section 410 is provided at an inner upper end thereof with a first engagement part 411 through which the control rod 440 is vertically guided. The body section 410 is also provided at an inner lower end thereof with a second engagement part 412 on which the first control plate 420 latch such that the first control plate cannot be further moved upwards.

The first control plate 420 controls an inflow of hydraulic pressure into the hydraulic cylinder 200 via the hydraulic connection line unit 300. The first control plate 420 is vertically slidably installed between the bottom of the body section 410 and the second engagement part 412. Here, the first control plate 420 is provided with a central hole (not shown) through which hydraulic pressure flows.

The first elastic member 430 serves to allow the internal hydraulic pressure of the hydraulic connection line unit 300 to be introduced into the hydraulic cylinder 200 only when the hydraulic pressure is of high pressure generated by waves. That is, the first elastic member 430 is installed between the first control plate 420 and the bottom of the body section 410 so as to support the first control plate 420. Thus, the first control plate 420 is moved downwards by the first elastic member 430 only when the internal hydraulic pressure of the hydraulic connection line unit 300 becomes higher than the elastic force of the first elastic member 430, thereby enabling the internal hydraulic pressure of the hydraulic connection line unit 300 to be introduced into the hydraulic cylinder 200.

The control rod 440 controls an inflow of internal hydraulic pressure of the hydraulic cylinder 200 into the hydraulic connection line unit 300. The control rod 440 is vertically slidably installed through the first engagement part 411. The control rod 440 is provided at a lower end thereof with a second control plate 441 that is planar and is provided opposite the first control plate 420. Here, the second control plate 441 serves to open and close the central hole of the first control plate 420 as the control rod 440 moves up and down.

The second elastic member 450 allows the internal hydraulic pressure of the hydraulic cylinder 200 to be introduced into the hydraulic connection line unit 300 only when the internal hydraulic pressure is of high pressure generated by waves. That is, the second elastic member 450 is located between the second control plate 441 and the first engagement part 411 in such a manner as to be inserted around the control rod 440, thereby supporting the second control plate 441. Thus, the second control plate 441 of the control rod 440 first comes into close contact with the first control plate 420 by means of the second elastic member 430, blocking the central hole, and then is moved upwards to open the central hole only when the internal hydraulic pressure of the hydraulic cylinder 200 becomes higher than the elastic force of the second elastic member 450, thereby allowing the internal hydraulic pressure of the hydraulic cylinder 200 to be introduced into the hydraulic connection line unit 300.

Here, the damping valve 400 is configured such that the elastic force of the second elastic member 450 is made greater than the elastic force of the first elastic member 430, in order that hydraulic pressure-circulation between the hydraulic connection line unit 300 and the hydraulic cylinder 200 is carried out only when the hydraulic pressure becomes high pressure generated by waves.

The operation of the apparatus for reducing pitching and rolling motions of a vessel constructed as previously described will be described with reference to FIGS. 1 to 5.

When waves roll against the vessel 10 floating on the sea, the buoyant member 100 located at hill of a wave ascends with the buoyant force of the waves, and the entire buoyant force of the vessel 10 is reduced as much as the buoyant member 100 ascends.

Concurrently, the rod of the hydraulic cylinder is pushed up by ascent of the buoyant member 100, increasing the internal hydraulic pressure of the hydraulic cylinder 200 and thus pushing up the control rod 440 of the damping valve 400, thereby allowing the hydraulic pressure to be fed and supplied to the hydraulic connection line unit 300.

As such, high hydraulic pressure introduced into the hydraulic connection line unit 300 is fed and introduced into a low-pressure region, i.e. the hydraulic cylinder 200 which is located at dale of a wave, while the first control plate 420 of the damping valve 400 is pushed down. Thus, the rod of the hydraulic cylinder 200 is pushed down to move down the buoyant members 100 so as to increase the buoyant force at those portions.

Like this, the buoyant member 100 located at hill of a wave reduces the buoyant force of a vessel because of its ascent caused by buoyant force, and the buoyant member 100 located at dale of a wave descends while being supplied via the hydraulic connection line unit 300 with high hydraulic pressure generated from the buoyant member 100 located at hill of a wave, increasing the buoyant force of a vessel 10 and therefore reducing the shaking of the vessel 10.

As previously set forth, according to the apparatus for reducing pitching and rolling motions of a vessel, the plurality of buoyant members 100 is disposed in the vessel 10 such that the hydraulic cylinders 200 connected with each other via the hydraulic connection line unit 300 are respectively connected to the upper ends of the buoyant members 100. This causes that hydraulic pressure that is generated concurrently with a rise of the hydraulic cylinder 200 when the buoyant member 100 located at hill of a wave ascends is supplied to the hydraulic cylinder 200 located at dale of a wave so as to lower the buoyant member 100 to cause the buoyant force of the vessel 10 to increase, thereby restricting the shaking of the vessel 10.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An apparatus for reducing pitching and rolling motions of a vessel, the apparatus comprising:
   a plurality of buoyant members vertically slidable;
   a plurality of hydraulic cylinders each connected to an upper end of one of the buoyant members to receive moving forces of the buoyant members that ascend with an action of waves; and
   a hydraulic connection line unit being a single pipe member which is connected to each of the plurality of hydraulic cylinders and through which hydraulic pressure is guided and carried among the plurality of hydraulic cylinders,
   wherein the hydraulic connection line unit is configured to supply hydraulic pressure, which is generated concurrently with a rise of at least one first hydraulic cylinder among the plurality of hydraulic cylinders when at least one corresponding first buoyant member among the plurality of buoyant members located at a hill of a wave ascends, to at least one second hydraulic cylinder among the plurality of hydraulic cylinders located at a dale of the wave, for lowering at least one corresponding second buoyant member among the plurality of buoyant members to cause a buoyant force of the vessel to increase, thereby restricting shaking of the vessel.

2. The apparatus according to claim 1, wherein the plurality of buoyant members is disposed at a stem or a stern of the vessel.

3. The apparatus according to claim 1, wherein the plurality of buoyant members is oppositely disposed one for each side of the vessel.

4. The apparatus according to claim 1, wherein the plurality of buoyant members is disposed at the bottom of the vessel.

5. The apparatus according to claim 1, wherein the apparatus further comprises:
- a damping valve disposed between the hydraulic cylinders and the hydraulic connection line unit and configured to
  - pass hydraulic pressure of the hydraulic cylinders, which is generated by the action of waves, between the hydraulic cylinders and the hydraulic connection line unit, and
  - block hydraulic pressure generated by a load on the vessel, the magnitude of the load being smaller than the buoyant force of the vessel, from passing between the hydraulic cylinders and the hydraulic connection line unit.

6. An apparatus for reducing pitching and rolling motions of a vessel, the apparatus comprising:
- a plurality of buoyant members disposed in such a manner as to be vertically slidable;
- a plurality of hydraulic cylinders each connected to an upper end of the buoyant member to receive a moving force of the buoyant member that ascends with the action of waves; and
- a hydraulic connection line unit connected in such a manner that hydraulic pressures of the hydraulic cylinders communicate with each other such that hydraulic pressure that is generated concurrently with a rise of the hydraulic cylinder when the buoyant member located at hill of a wave ascends is supplied to the hydraulic cylinder located at dale of a wave so as to lower the buoyant member to cause the buoyant force of the vessel to increase, thereby restricting the shaking of the vessel,
- wherein the apparatus comprises a damping valve that is disposed between the hydraulic cylinders and the hydraulic connection line unit to perform a control operation such that high hydraulic pressure of the hydraulic cylinder, which is generated concurrently with a rise of the buoyant member by means of the action of waves, is allowed to pass through the hydraulic cylinders and hydraulic connection line unit, and hydraulic pressure generated by a change in load of an object including goods shipped in a vessel, the magnitude of load being smaller than the buoyant force of the vessel, is blocked from passing through the hydraulic cylinders and hydraulic connection line unit, and
- wherein the damping valve includes:
- a barrel-type body section, opposite ends of which are coupled to one of the plurality of the hydraulic cylinders and hydraulic connection line unit, and having first and second engagement parts in an inner side thereof;
- a first control plate vertically slidable between the bottom of the body section and the second engagement part and having a central hole;
- a first elastic member installed between the first control plate and the bottom of the body section to support the first control plate;
- a control rod vertically slidable through the first engagement part and having at a lower end thereof a second control plate opposite to the first control plate; and
- a second elastic member installed between the second control plate and the first engagement part, configured to be inserted around the control rod to allow the second control plate to block the central hole of the first control plate.

7. The apparatus according to claim 6, wherein the elastic force of the second elastic member is greater than that of the first elastic member.

8. The apparatus according to claim 1, further comprising:
- a barrel-type guide member through which one of the plurality of buoyant members is guided to vertically move in an inserted state, and
- an elastic member disposed inside the guide member to prevent the one buoyant member that is ascending from colliding with the guide member.

9. The apparatus according to claim 5, further comprising:
- a barrel-type guide member through which one of the plurality of buoyant members is guided to vertically move in an inserted state, and
- an elastic member disposed inside the guide member to prevent the one buoyant member that is ascending from colliding with the guide member.

10. The apparatus according to claim 1, wherein the hydraulic connection line unit is configured to maintain hydraulic pressures of the plurality of hydraulic cylinders to be of the same value.

* * * * *